United States Patent
Kats et al.

(10) Patent No.: US 11,176,268 B1
(45) Date of Patent: Nov. 16, 2021

(54) SYSTEMS AND METHODS FOR GENERATING USER PROFILES

(71) Applicant: Symantec Corporation, Mountain View, CA (US)

(72) Inventors: Daniel Kats, Culver City, CA (US); Petros Efstathopoulos, Culver City, CA (US); Chris Gates, Culver City, CA (US)

(73) Assignee: NortonLifeLock Inc., Tempe, AZ (US)

( * ) Notice: Subject to any disclaimer, the term of this patent is extended or adjusted under 35 U.S.C. 154(b) by 300 days.

(21) Appl. No.: 16/202,866

(22) Filed: Nov. 28, 2018

(51) Int. Cl.
| G06F 21/62 | (2013.01) |
| H04L 29/08 | (2006.01) |
| G06F 16/2458 | (2019.01) |
| H04L 29/06 | (2006.01) |
| G06F 16/335 | (2019.01) |

(52) U.S. Cl.
CPC ...... *G06F 21/6245* (2013.01); *G06F 16/2468* (2019.01); *G06F 16/337* (2019.01); *H04L 63/102* (2013.01); *H04L 67/306* (2013.01)

(58) Field of Classification Search
CPC ............. G06F 21/6245; G06F 16/2468; G06F 16/337; H04L 63/102; H04L 67/306
See application file for complete search history.

(56) References Cited

U.S. PATENT DOCUMENTS

| 8,479,299 B1 * | 7/2013 | Cooley | G06F 21/6245 726/26 |
| 10,248,532 B1 * | 4/2019 | Wasiq | G06F 11/3452 |
| 2010/0241687 A1 * | 9/2010 | Shein | G06Q 30/02 709/203 |
| 2010/0306854 A1 * | 12/2010 | Neergaard | G06F 21/6254 726/26 |
| 2015/0154647 A1 * | 6/2015 | Suwald | H04N 21/25891 705/14.66 |
| 2015/0332439 A1 * | 11/2015 | Zhang | G06F 21/6254 345/647 |
| 2017/0161439 A1 * | 6/2017 | Raduchel | G06Q 10/063 |
| 2018/0357563 A1 * | 12/2018 | Kurian | G06N 20/00 |

OTHER PUBLICATIONS

Saraswathi Punagin et al., "A Novel Query Obfuscation Scheme with User Controlled Privacy and Personalization," International Journal of Computer Applications (0975-8887) vol. 158—No. 1, Jan. 2017, pp. 50-57 (Year: 2017).*

Imdad Ullah et al., "ProfileGuard: Privacy Preserving Obfuscation for Mobile User Profiles,", Nov. 3, 2014, pp. 83-92 (Year (Year: 2014).*

* cited by examiner

Primary Examiner — Luu T Pham
Assistant Examiner — Canh Le
(74) Attorney, Agent, or Firm — FisherBroyles, LLP

(57) ABSTRACT

The disclosed computer-implemented method for generating user profiles may include (i) analyzing a data set of user profiles for services, (ii) detecting a measurement of obfuscation that was applied to a specific attribute across multiple user profiles for a specific service, (iii) applying the measurement of obfuscation to true data for a new user by fuzzing the true data to create a fuzzed value, and (iv) generating automatically a new user profile for the specific service by populating the specific attribute within the new user profile with the fuzzed value. Various other methods, systems, and computer-readable media are also disclosed.

20 Claims, 6 Drawing Sheets

SYSTEMS AND METHODS FOR GENERATING USER PROFILES

BACKGROUND

Multiple personas are a trend in the field of identity protection. This trend results from ubiquitous tracking and linking by businesses across websites, physical locations, and transactions. Multiple personas arise in a variety of settings including disposable emails, one-time credit card numbers, usernames on forums, and giving a fake name at businesses such as coffee houses.

Multiple personas are primarily used to compartmentalize a person's digital life between different contexts. One important factor in the creation and curation of multiple personas is the poor quality of privacy controls on existing platforms, because users may find existing privacy options inadequate.

Recent work suggests that correlations between accounts created on different platforms by ad agencies are established based on items of information including email, name, address, zip code, and age. Ideally, there would be strict privacy controls surrounding such personal data. Unfortunately, this is not currently the case in some locations, and it is standard operating practice for most online services to sell any collected data to ad networks or otherwise utilize it for a non-primary purpose. The instant disclosure, therefore, identifies and addresses a need for improved systems and methods for generating user profiles.

SUMMARY

As will be described in greater detail below, the instant disclosure describes various systems and methods for generating user profiles. In one example, a computer-implemented method for generating user profiles may include (i) analyzing a data set of user profiles for services, (ii) detecting a measurement of obfuscation that was applied to a specific attribute across multiple user profiles for a specific service, (iii) applying the measurement of obfuscation to true data for a new user by fuzzing the true data to create a fuzzed value, and (iv) generating automatically a new user profile for the specific service by populating the specific attribute within the new user profile with the fuzzed value.

In some examples, analyzing the data set of user profiles for services may include generating a generative model. In one embodiment, the generative model is generated using machine learning such that the generative model learns how much obfuscation users previously applied to the specific attribute to protect their privacy when creating historical user profiles. In one embodiment, the generative model either matches the measurement of obfuscation to the specific service or matches the measurement of obfuscation to a combination of the specific service and the specific attribute.

In one embodiment, the specific attribute may include (i) a location of the new user, (ii) a birthday of the new user, (iii) a picture of the new user, and/or (iv) a name of the new user. In some examples, analyzing the data set of user profiles may include detecting that users previously fuzzed values for the specific attribute by omitting a field of true data for the specific attribute and/or generating random data for the specific attribute.

In one embodiment, the data set of user profiles is derived from an identity management system and/or a password management system. In one embodiment, the data set of user profiles may include both more accurate underlying descriptions of user profile data and actual historical user profiles that are populated based at least in part on data within the more accurate underlying descriptions of user profile data. In some examples, analyzing the data set may include comparing the actual historical user profiles with the more accurate underlying descriptions of user profile data. In one embodiment, the method may further include performing a security action to protect the privacy of the new user corresponding to the new user profile.

In one embodiment, a system for implementing the above-described method may include (i) an analysis module, stored in memory, that analyzes a data set of user profiles for services, (ii) a detection module, stored in memory, that detects a measurement of obfuscation that was applied to a specific attribute across multiple user profiles for a specific service, (iii) an application module, stored in memory, that applies the measurement of obfuscation to true data for a new user by fuzzing the true data to create a fuzzed value, and (iv) a generation module, stored in memory, that generates automatically a new user profile for the specific service by populating the specific attribute within the new user profile with the fuzzed value, and (v) at least one physical processor configured to execute the analysis module, the detection module, the application module, and the generation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) analyze a data set of user profiles for services, (ii) detect a measurement of obfuscation that was applied to a specific attribute across multiple user profiles for a specific service, (iii) apply the measurement of obfuscation to true data for a new user by fuzzing the true data to create a fuzzed value, and (iv) generate automatically a new user profile for the specific service by populating the specific attribute within the new user profile with the fuzzed value.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
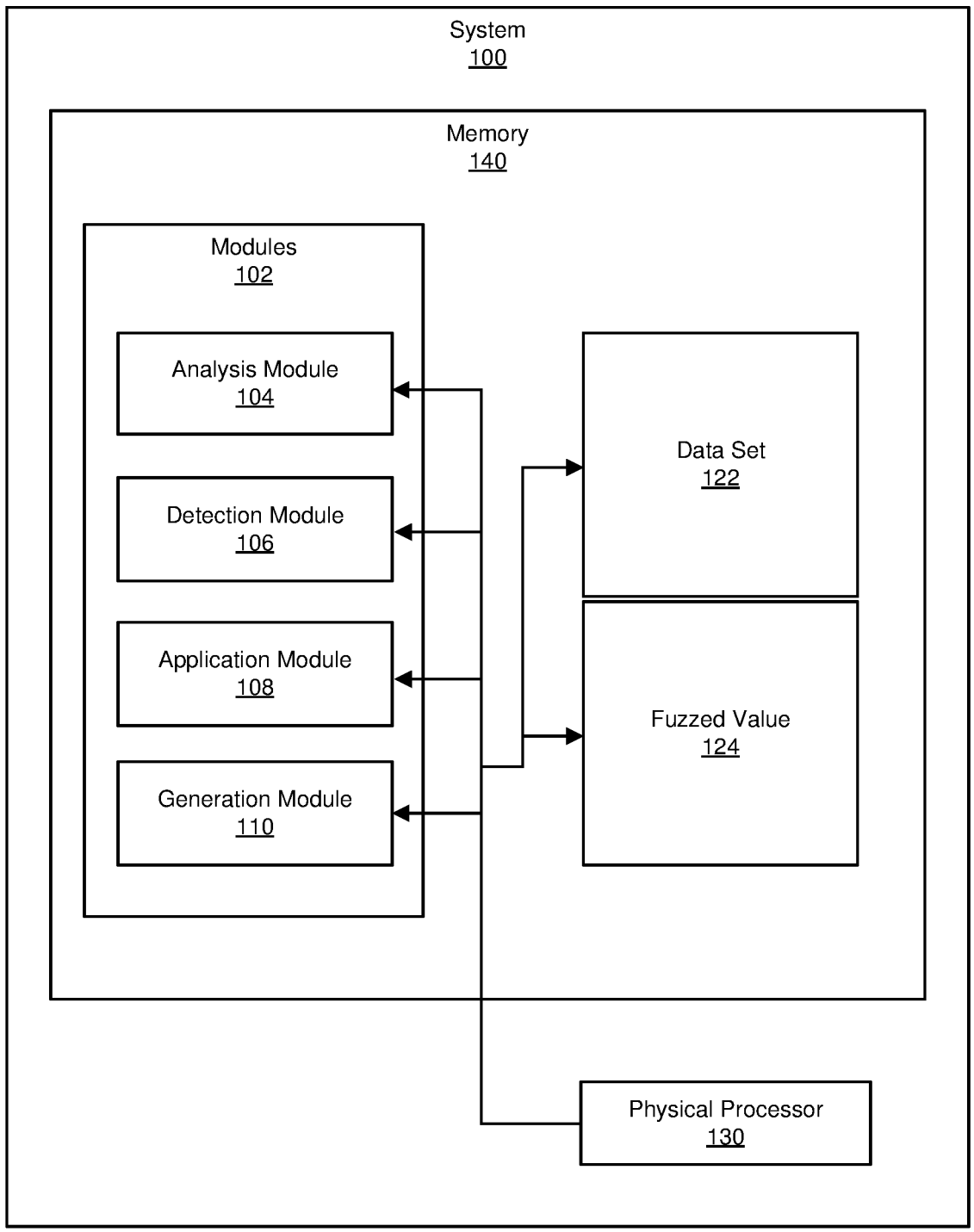
FIG. 1 is a block diagram of an example system for generating user profiles.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for generating user profiles. The disclosed subject matter may improve upon related systems by increasing the usefulness of automatically generated user profiles, such as automatically generated user profiles maintained by an identity management system. Related systems may automatically generate user profiles without fully understanding a level of obfuscation or fuzziness that users typically apply when manually creating user profiles themselves. Accordingly, related systems may unintentionally populate fields of data within new user profiles with too much information, or with information that has too high of a degree of accuracy or precision, to satisfy the users' corresponding desired or expected level of privacy. Accordingly, the disclosed subject matter herein may automatically learn or detect a level of obfuscation or fuzziness that users previously applied when manually generating user profiles and then intelligently apply the measured level of obfuscation to one or more fields of data in automatically generating new user profiles. Accordingly, the disclosed subject matter may improve upon related systems by generating new user profiles that more closely satisfy the users' expected or desired level of disclosure and/or concealment when populating fields of the user profiles with personal information.

Figure 2:
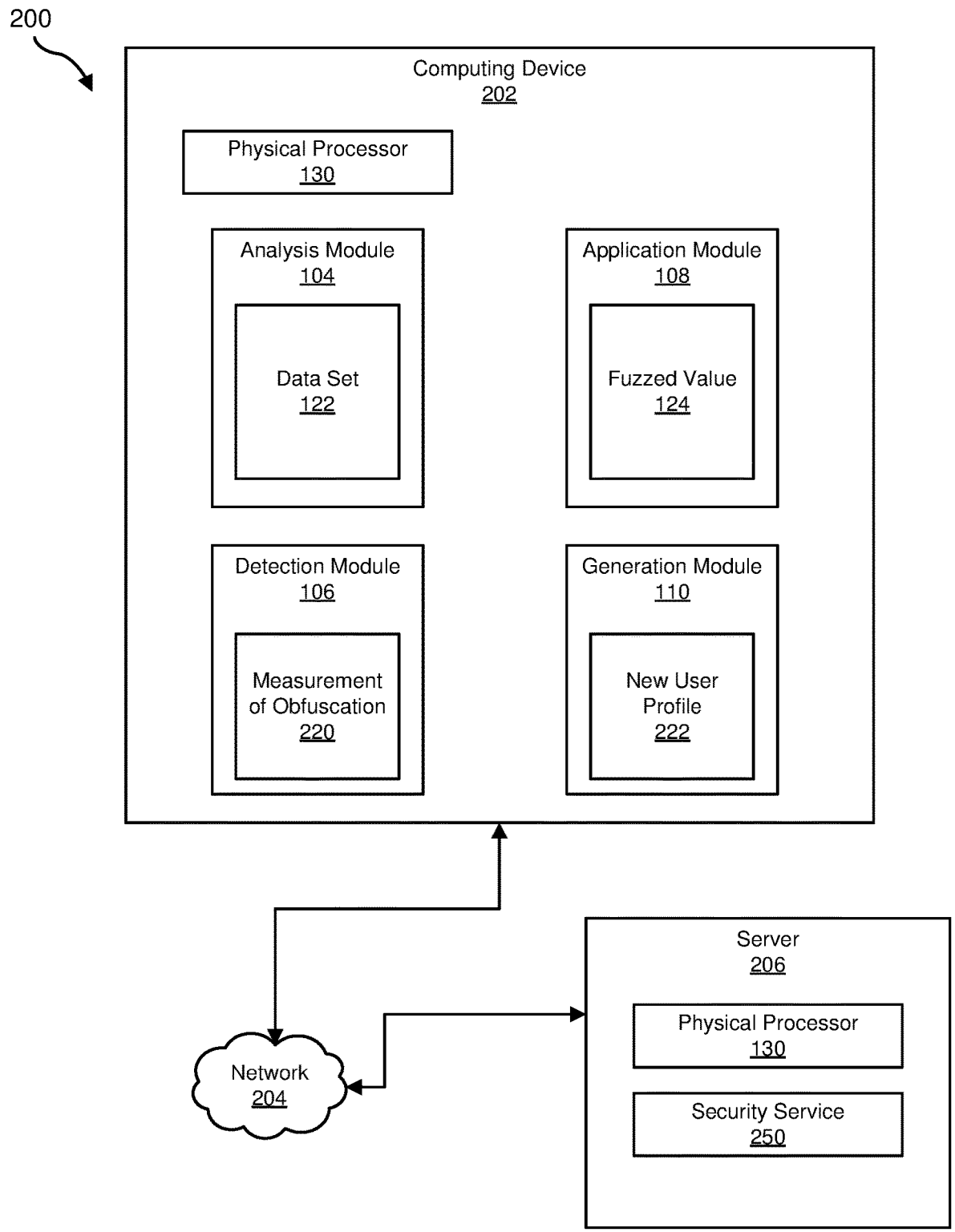
FIG. 2 is a block diagram of an additional example system for generating user profiles.

The following will provide, with reference to FIGS. 1-2, detailed descriptions of example systems for generating user profiles. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for generating user profiles. As illustrated in this figure, example system 100 may include one or more modules 102 for performing one or more tasks. For example, and as will be explained in greater detail below, example system 100 may include an analysis module 104 that analyzes a data set of user profiles for services, such as a data set 122. Example system 100 may additionally include a detection module 106 that detects a measurement of obfuscation that was applied to a specific attribute across multiple user profiles for a specific service. Example system 100 may also include an application module 108 that applies the measurement of obfuscation to true data for a new user by fuzzing the true data to create a fuzzed value, such as a fuzzed value 124. Example system 100 may additionally include a generation module 110 that generates automatically a new user profile for the specific service by populating the specific attribute within the new user profile with the fuzzed value. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate generating user profiles. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to generate user profiles.

For example, and as will be described in greater detail below, analysis module 104 may analyze data set 122 of user profiles for services. Detection module 106 may detect a measurement of obfuscation 220 that was applied to a specific attribute across multiple user profiles for a specific service. Application module 108 may apply measurement of obfuscation 220 to true data for a new user by fuzzing the true data to create fuzzed value 124. Generation module 110 may generate automatically a new user profile 222 for the specific service by populating the specific attribute within new user profile 222 with fuzzed value 124.

Computing device 202 generally represents any type or form of computing device capable of reading computer-executable instructions. In one illustrative example, computing device 202 may correspond to a client-side endpoint computing device for recreational use. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300. In one illustrative example, server 206 may correspond to a backend server of a security service, such as a security service 250. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
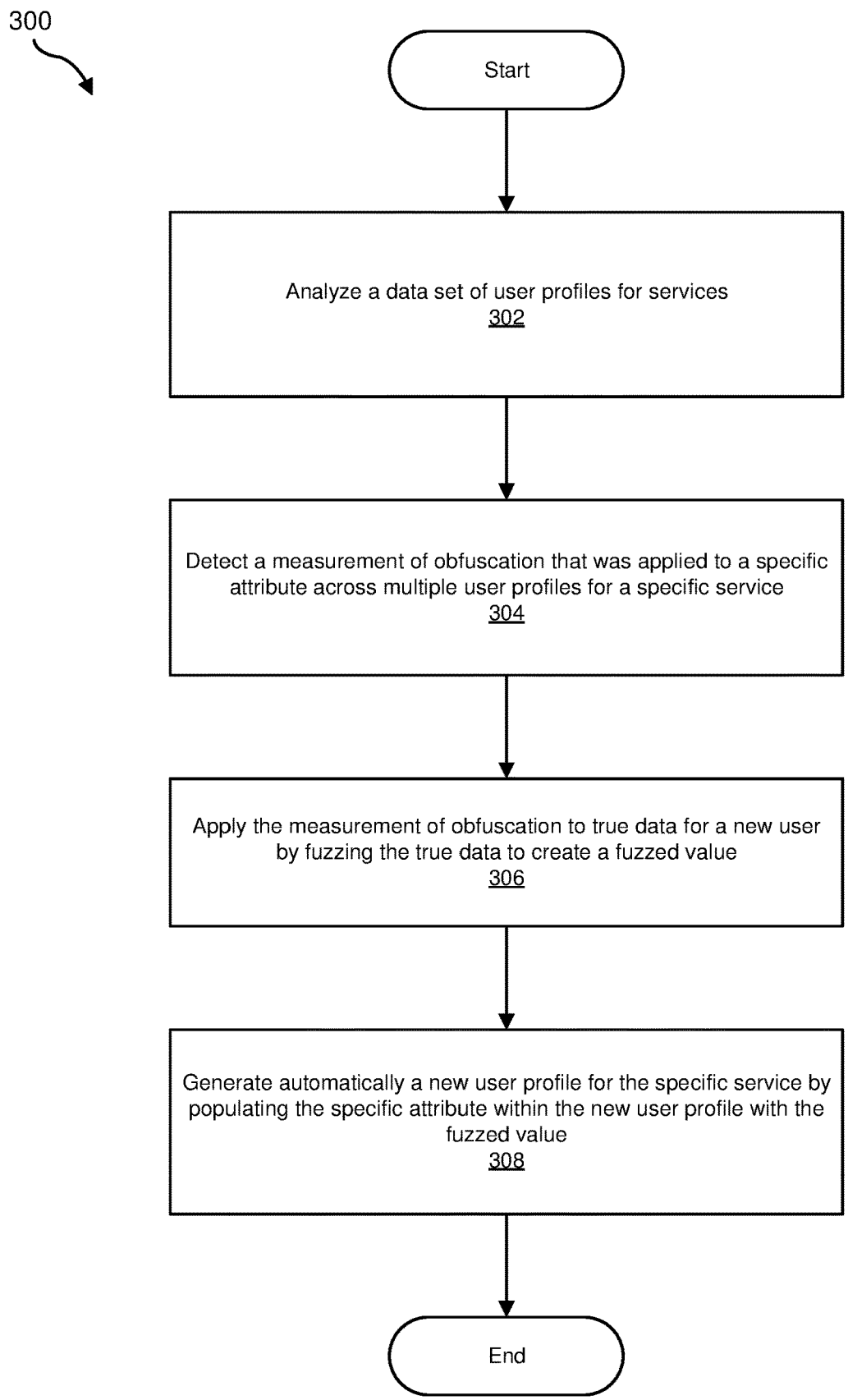
FIG. 3 is a flow diagram of an example method for generating user profiles.

FIG. 3 is a flow diagram of an example computer-implemented method 300 for generating user profiles. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may analyze a data set of user profiles for services. For example, analysis module 104 may, as part of computing device 202 in FIG. 2, analyze data set 122 of user profiles for services. As used herein, the term "services" may include online services and/or businesses.

Analysis module 104 may analyze the data set of user profiles in a variety of ways. In some examples, analysis module 104 may analyze a data set that was derived from an identity management system, a password management system, an identity theft prevention system, and/or a browser, phone, or computing device auto-fill system. In further examples, analysis module 104 may analyze a data set that includes both (i) more accurate underlying descriptions of user profile data and (ii) actual historical user profiles that are populated based at least in part on data within the more accurate underlying descriptions of user profile data. In other words, the more accurate underlying descriptions of user profile data may provide a more accurate or complete description of the corresponding user then one or more of the actual historical user profiles that the user generated or adopted. Accordingly, analysis module 104 may in some examples compare the more accurate underlying descriptions of user profile data with the actual historical user profiles to thereby reveal which items or portions of information the users purposefully chose to reveal and/or conceal from the corresponding services. Detection module 106 may thereby detect the measurement of obfuscation or fuzziness that the users preferred when generating user profiles for specific services, as discussed in more detail below regarding step 304 of method 300.

In further examples, analysis module 104 may analyze the data set of user profiles for services by generating a generative model. As used herein, the term "generative model" generally refers to a model that may generate user profiles. In some examples, the generative model may generate user profiles, as output, in response to the request to generate the user profiles based on one or more items of input, such as actual or historical user profiles. In some examples, analysis module 104 may generate the generative model using machine learning. For example, analysis module 104 may apply one or more machine learning algorithms, systems, and/or protocols to the data set of user profiles and, in response, analysis module 104 may thereby generate the generative model, which may in turn generate new user profiles.

At step 304, one or more of the systems described herein may detect, through a detection module, a measurement of obfuscation that was applied to a specific attribute across multiple user profiles for a specific service. For example, detection module 106 may, as part of computing device 202 in FIG. 2, detect measurement of obfuscation 220 that was applied to a specific attribute across multiple user profiles for a specific service.

As used herein, the term "a measurement of obfuscation" generally and broadly refers to any result of a mathematical or other analysis to encode or measure how users obfuscated one or more items of information when submitting the information to a corresponding service. In one illustrative example, a "measurement of obfuscation" may correspond to the mathematical output of a machine learning algorithm such that the mathematical output is itself not readily parsable or understandable to a human user, but nevertheless may be used to partially or entirely repeat the process of obfuscation measured by the machine learning algorithm, as discussed in more detail below.

Detection module 106 may detect the measurement of obfuscation in a variety of ways. As used herein, the term "measurement of obfuscation" generally refers to any measurement or indication of how much obfuscation or fuzziness users applied when previously generating or adopting user profiles, such as the user profiles within data set 122. Moreover, as used herein, the terms "obfuscation" and/or "fuzziness" are generally used interchangeably and refer to (i) reducing accuracy of one or more items of information, (ii) reducing a precision of one or more items of information, and/or (iii) omitting and/or randomizing one or more items of information. Generally speaking, users may apply a level of obfuscation and/or fuzziness to one or more items of information in order to protect their privacy, as discussed in more detail below.

For example, detection module 106 may detect the measurement of obfuscation in a variety of ways. In some examples, detection module 106 may apply the generative model that was created by analysis module 104, as further described above. In more specific examples, detection module 106 may apply a generative model that analysis module 104 created according to a machine learning algorithm and/or protocol. Additionally, or alternatively, detection module 106 may detect the measurement of obfuscation at least in part by comparing a more complete or more accurate set of information describing a user with one or more actual or historical user profiles that the user generated or adopted. Accordingly, by comparing the more complete or more accurate set of information with the actual or historical user profiles, detection module 106 may thereby detect a level of obfuscation or fuzziness that the users applied when generating or adopting the user profiles. In other words, by performing this comparison, detection module 106 may thereby learn which items of information the users preferred to reveal, which items of information the users preferred to omit, and/or a level of obfuscation or fuzziness that the users preferably applied when generating or adopting the user profiles.

In further examples, machine learning may enable the generative model to effectively learn how much obfuscation or fuzzing users were previously applying to user profiles for specific services and/or to specific attributes of user profiles for the specific services. In other words, in one embodiment, the generative model either matches the measurement of obfuscation to the specific service (e.g., a level of obfuscation that was uniformly applied to all attributes of user profiles for that specific service) and/or matches the measurement of obfuscation to a combination of the specific service and the specific attribute (e.g., in a scenario where users applied different levels of obfuscation for different attributes within the same user profile for the same specified service).

In one embodiment, the specific attribute may include at least one of: (i) a location of the new user, (ii) a birthday of the new user, (3) a picture or a photograph of the new user, and/or (iv) a name of the new user. For example, detection module 106 may detect how much users previously reduced a level of accuracy and/or a level of precision when revealing their own location. Additionally, or alternatively, detection module 106 may detect whether users omitted one or more fields of information corresponding to the location (e.g., detect whether users omitted, or revealed, items of information corresponding to the fields of address number, street name, city name, state name, and/or zip code). Similarly, detection module 106 may detect how much users previously reduced a level of accuracy and/or a level of precision when revealing the birthday. For example, users may intentionally manipulate, partially randomize, and/or render more or less inaccurate one or more fields of the birthday, such as the day within the month, the month, and/or the year. Additionally, or alternatively, detection module 106 may detect whether users omitted one or more fields corresponding to the birthday, such as the day within the month, the month, and/or the year. The same principles may be applied analogously to other specific attributes such as pictures or photographs of the new user and/or the name of the new user. In other words, detection module 106 may detect how much information users are revealing through pictures or photographs and/or strings of text corresponding to the names, such as in scenarios where users reduce the accuracy, precision, and/or size of these items of information, such as omitting one or more fields (e.g., first name, middle name, and/or last name).

At step 306, one or more of the systems described herein may apply the measurement of obfuscation to true data for a new user by fuzzing the true data to create a fuzzed value.

For example, application module 108 may, as part of computing device 202 in FIG. 2, apply measurement of obfuscation 220 to true data for a new user by fuzzing the true data to create fuzzed value 124. As used herein, the term "true data" simply refers to an item of data prior to the data being obfuscated or fuzzed in accordance with step 306. For example, true data may correspond to a string of text that includes the user's full name, including first name, middle name, and last name, and application module 108 may apply the measurement of obfuscation in some examples by removing the middle name.

Application module 108 may apply the measurement of obfuscation in a variety of ways. In general, application module 108 may apply the measurement of obfuscation by reducing a level of accuracy or precision of the true data, as further described above. Because detection module 106 detected the measurement of obfuscation based on the data set of actual or historical user profiles, system 200 may have a level of confidence that application module 108 will perform the reducing and/or concealment to a degree that matches the user's desires, expectations, and/or comfort level (e.g., because the level of reducing and/or concealment through fuzzing will match how other similarly situated users manually performed the same task of fuzzing).

At step 308, one or more of the systems described herein may generate automatically a new user profile for the specific service by populating the specific attribute within the new user profile with the fuzzed value. For example, generation module 110 may, as part of computing device 202 in FIG. 2, generate automatically new user profile 222 for the specific service by populating the specific attribute within new user profile 222 with fuzzed value 124.

Generation module 110 may generate the new user profile in a variety of ways. In some examples, generation module 110 may generate the new user profile in response to a request to generate the new user profile. In further examples, the request to generate the new user profile may specify the specific service to which the new user profile will apply or to which the new user profile will be registered. For example, the request may specify that the new user profile will be a new user profile for an online banking service, a recommendation service such as YELP, an online forum such as a support forum, a hoteling service such as AIRBNB, and/or a retailer such as STARBUCKS or an online grocery store.

Additionally, or alternatively, in some examples generation module 110 may also perform a security action to protect the privacy of the new user corresponding to the new user profile. Illustrative examples of the security action may include performing the obfuscating and/or fuzzing task of steps 304-306, removing one or more items of data from a user profile, and/or blocking, denying, and/or rejecting one or more requests for items of data describing the user.

Accordingly, in response to receiving the request to generate the new user profile, generation module 110 may populate some or all of the fields of a template that matches the corresponding service. Generation module 110 may populate some or all of the fields after one or more items of true data for these fields have been obfuscated or fuzzed in accordance with steps 302-306, as further discussed above in connection with method 300 of FIG. 3. In some examples, generation module 110 may automatically generate the new user profile and register it with the specific service for the convenience of the user. Alternatively, in other examples generation module 110 may automatically generate the new user profile and then present the new user profile to the user for acceptance, rejection, and/or revision. In these further examples, generation module 110 may present a range of candidate new user profiles and/or a range of candidate obfuscated values for one or more attributes within one or more candidate user profiles, to enable the user to select and/or revise the candidate user profiles according to the user's preferences.

Of course, in some examples the data set used to detect the measurement of obfuscation may include data regarding profiles populated by users other than the user for which step 308 is being performed to create a new profile. Additionally, or alternatively, in some examples the data set used to detect the measurement of obfuscation may include data regarding profiles previously populated by the same user for which step 308 is being performed to create the new profile. Accordingly, generation module 110 may generate the new profile to accommodate a level of expected or desired obfuscation as indicated by the data set including previous examples of profiles generated by the new user and/or other users.

Furthermore, in addition to the information obtained from detecting the measurement of obfuscation according to method 300, generation module 110 may also base the generation of the new profile on one or more user settings manually specified by the new user. For example, as an additional factor for generation module 110 to consider when generating the new profile, generation module 110 may also consider one or more settings that had been previously or currently set by the new user to indicate a currently desired or expected level of obfuscation. Accordingly, generation module 110 may base the generation of the new profile on at least two separate items of information: (i) the detected level of obfuscation that was detected through machine learning or other analysis in accordance with steps 302-306, and/or (ii) one or more manually set or otherwise specified indications of the new user's currently preferred settings, desires, expectations, etc. Moreover, generation module 110 may optionally weight one or more of these two different items of information such that they are given different levels of emphasis or priority when generating the new profile in proportion to the weights.

In some examples, the settings may include a global setting indicating a general level of obfuscation for the entire new profile. Additionally, or alternatively, the settings may also include more granular settings that indicate individual levels of preferred or desired obfuscation for one or more specific fields within the new profile and/or for one or more specific subsets of fields within the new profile. Moreover, as used throughout this application, the measurement of obfuscation corresponding to steps 304-306, as well as the indication of a desired or expected level of obfuscation manually set by the user in accordance with this paragraph, may be measured using any suitable methodology, including the output of a machine learning algorithm, a measurement along a scale (e.g., a scale from 1 to 10 in terms of increasing levels of obfuscation), and/or selection of one or more categories or types of obfuscation previously defined through machine learning or other analysis.

Figure 4:
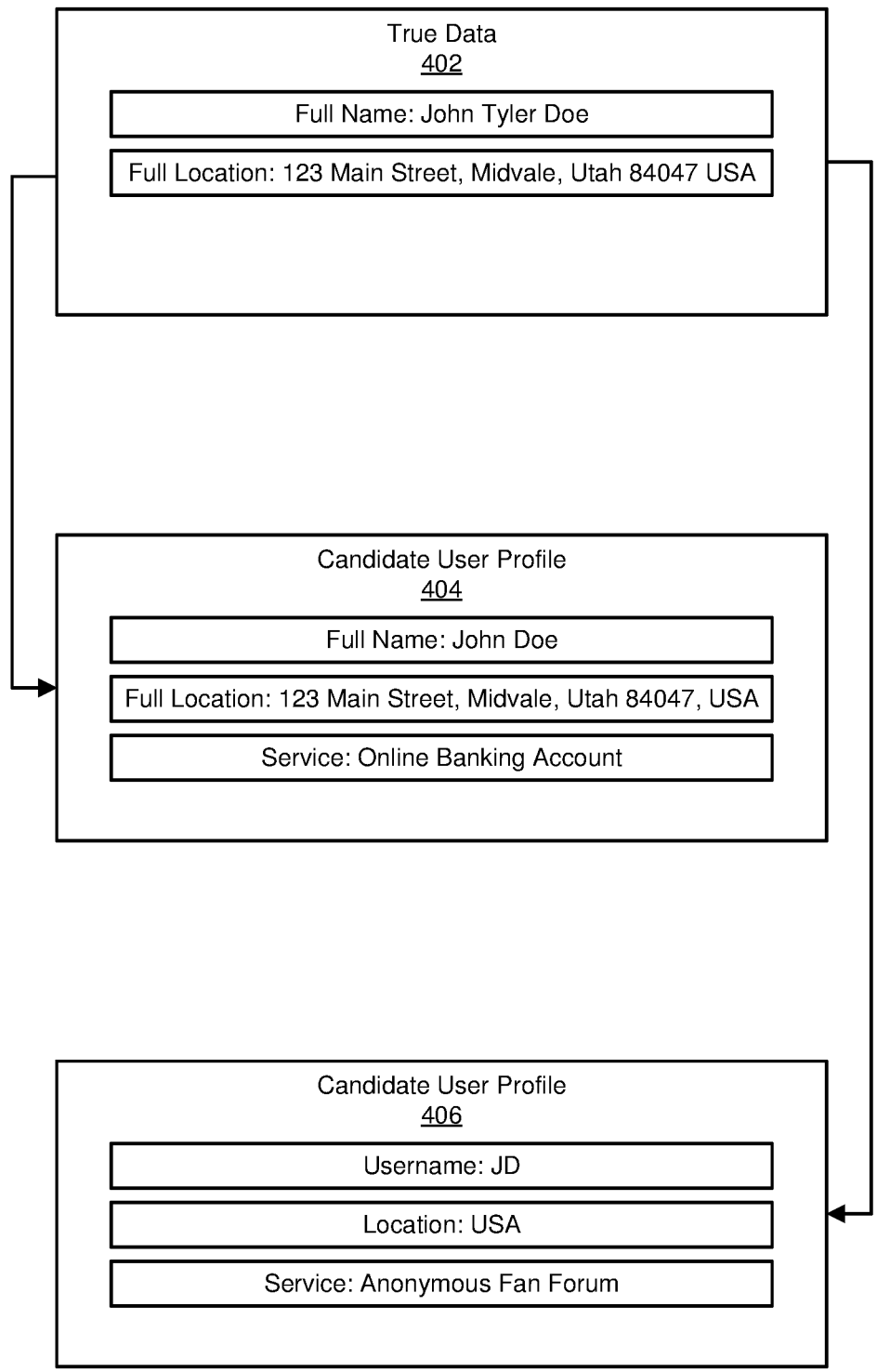
FIG. 4 is a block diagram of an example data set.

FIG. 4 shows an example of a data set, including true data 402, a candidate user profile 404, and a candidate user profile 406. The illustrations of these example items of data help show one embodiment of the systems and methods described above. As further shown in this figure, true data 402 may include a more complete and accurate set of data for a user than the user would reveal in one or more user profiles, such as candidate user profile 404 and/or candidate user profile 406. More specifically, true data 402 includes a string of text that further includes the user's full and complete name (i.e., John Tyler Doe). Additionally, true data 402 also includes a string of text that further includes the user's full and complete location or address (i.e., 123 Main Street, Midvale, Utah 84047, USA).

In contrast, candidate user profile 404 may have been generated by generation module 110, in accordance with method 300, such that one or more items of information for candidate user profile 404 may have been obfuscated or fuzzed to thereby help protect the privacy of the user's information. In this specific example, candidate user profile 404 may be generated by generation module 110 to correspond to the specific service of an online banking account. Because online banking accounts are generally more trustworthy and protective of a user's private data, candidate user profile 404 may indicate a relatively low level of obfuscation or fuzzing. More specifically, the example of candidate user profile 404 may match exactly the full set of information included within true data 402, with the exception that candidate user profile 404 has removed the indication of the user's middle name from the field of data specifying the user's name. For example, candidate user profile 404 specifies the same full address information as true data 402 does.

In further contrast, candidate user profile 404 may be generated by generation module 110, in accordance with method 300, such that the corresponding items of information for candidate user profile 406 have received a much higher level of obfuscation and/or fuzzing. More specifically, FIG. 4 illustrates how candidate user profile 406 was generated by generation module 110 to apply to an anonymous fan forum (e.g., an anonymous forum for fans of movies or books, etc.). The anonymous fan forum may have a reputation for being much less protective of a user's private data than the online banking system corresponding to candidate user profile 404. Accordingly, system 200 may apply a much higher level of obfuscation and/or fuzzing when automatically generating candidate user profile 406. As further illustrated in this figure, candidate user profile 406 may only specify the user's name as "JD," which indicates that the full name of the user from true data 402 has been both modified, randomized, and/or manipulated, and also that one field of the data from true data 402 has been removed (e.g., although "JD" includes initials for the user's first name and last name, it does not include any item of information corresponding to the user's middle name). Similarly, candidate user profile 406 only specifies the country where the user is located (e.g., United States) and has thereby omitted all of the remaining fields of data corresponding to the user's location, as further illustrated in true data 402 of FIG. 4. Additionally, or alternatively, in other examples the candidate user profile may actually specify an incorrect and/or spoof location (e.g., specify a country of Spain even though the user resides in the United States).

As further described above, the disclosed subject matter may improve upon related systems by increasing the usefulness of automatically generated user profiles, such as automatically generated user profiles maintained by an identity management system. Related systems may automatically generate user profiles without fully understanding a level of obfuscation or fuzziness that users typically apply when manually creating user profiles themselves. Accordingly, related systems may unintentionally populate fields of data within new user profiles with too much information, or with information that has too high of a degree of accuracy or precision, to satisfy the users' corresponding desired or expected level of privacy. Accordingly, the disclosed subject matter herein may automatically learn or detect a level of obfuscation or fuzziness that users previously applied when manually generating user profiles and then intelligently apply the measured level of obfuscation to one or more fields of data in automatically generating new user profiles. Accordingly, the disclosed subject matter may improve upon related systems by generating new user profiles that more closely satisfy the users' expected or desired level of disclosure and/or concealment when populating fields of the user profiles with personal information.

Figure 5:
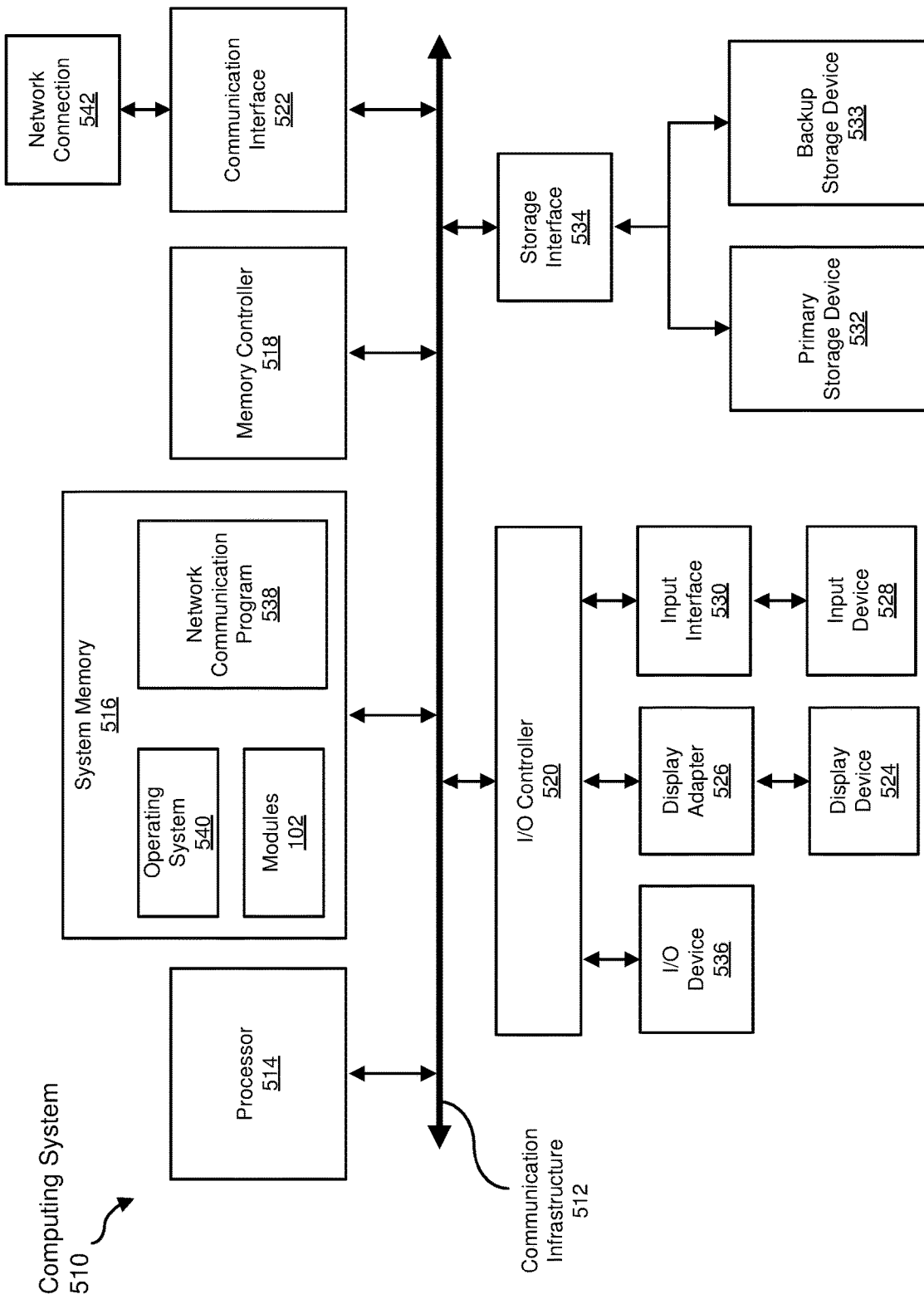
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
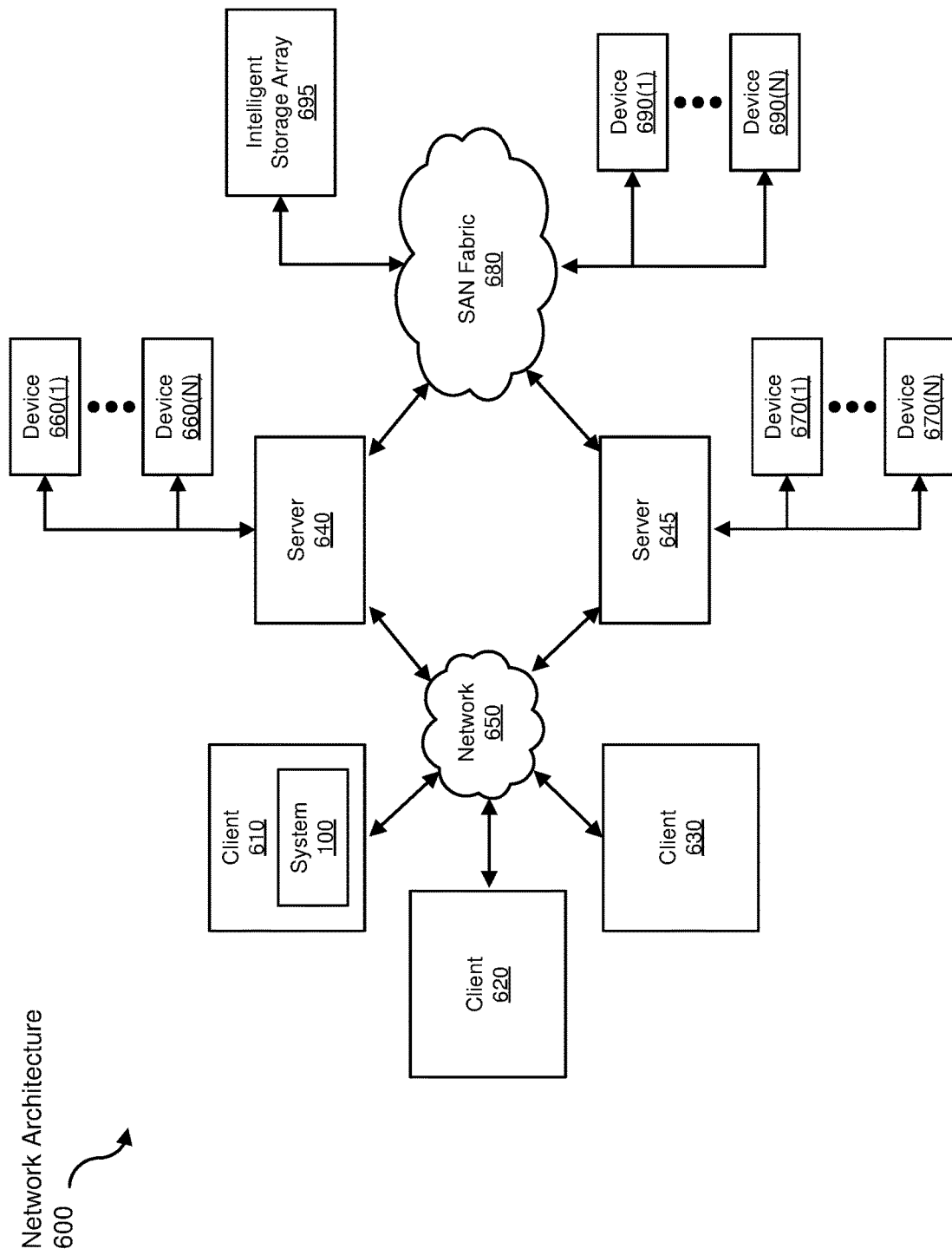
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(i)-(N) may be directly attached to server 645. Storage devices 660(i)-(N) and storage devices 670(i)-(N) generally represent any type or form of storage device or medium capable of storing data and/or other computer-readable instructions. In certain embodiments, storage devices 660(i)-(N) and storage devices 670(i)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(i)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(i)-(N) and array 695 appear as locally attached devices to client systems 610, 620, and 630. As with storage devices 660(1)-(N) and storage devices 670(i)-(N), storage devices 690(i)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(i)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(i)-(N), storage devices 670(i)-(N), storage devices 690(i)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for generating user profiles.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for generating user profiles, at least a portion of the method being performed by a computing device comprising at least one processor, the method comprising:

analyzing a data set of user profiles for services and creating, by applying a machine learning protocol to the data set of user profiles, a generative model that generates new user profiles for users rather than the users manually creating the user profiles;

detecting, by a detection module, a measurement of obfuscation that users previously applied to a specific attribute when manually creating user profiles for a specific service;

applying, by an application module, the measurement of obfuscation that users previously applied to the specific attribute of the user profiles to true data for a new user by fuzzing the true data to create a fuzzed value; and generating automatically a new user profile for a user of the specific service by populating the specific attribute within the new user profile with the fuzzed value;

comparing, by the detection module, by the detection module, a more accurate set of information describing users with historical user profiles that the users manually generated, wherein the detection module learns both a set of items of information the users preferred to reveal and a set of items of information the users preferred to omit; and protecting, by the application module, the privacy of the user by denying a request for data describing the user or reducing a level of accuracy of the true data when creating the fuzzed value to a degree that matches how the users manually performed a previous task of fuzzing.

2. The computer-implemented method of claim 1, further comprising performing a security action to protect the privacy of the new user corresponding to the new user profile.

3. The computer-implemented method of claim 2, wherein the security action comprises
alerting the new user to the request for data describing the user.

4. The computer-implemented method of claim 1, wherein the generative model either:
matches the measurement of obfuscation to the specific service; or
matches the measurement of obfuscation to a combination of the specific service and the specific attribute.

5. The computer-implemented method of claim 1, wherein the specific attribute comprises at least one of:
a location of the new user; or
a birthday of the new user.

6. The computer-implemented method of claim 1, wherein analyzing the data set of user profiles comprises detecting that users previously fuzzed values for the specific attribute by at least one of:
omitting a field of true data for the specific attribute; or
generating random data for the specific attribute.

7. The computer-implemented method of claim 1, wherein the data set of user profiles is derived from a password management system.

8. The computer-implemented method of claim 1, wherein the specific attribute comprises a picture of the new user.

9. The computer-implemented method of claim 1, wherein the specific attribute comprises a name of the new user.

10. The computer-implemented method of claim 1, wherein the data set of user profiles is derived from an identity management system.

11. A system for generating user profiles, the system comprising:
an analysis module, stored in memory, that analyzes a data set of user profiles for services and creates, by applying a machine learning protocol to the data set of user profiles, a generative model that generates new user profiles for users rather than the users manually creating the user profiles;
a detection module, stored in memory, that detects a measurement of obfuscation that users previously applied to a specific attribute when manually creating user profiles for a specific service;
an application module, stored in memory, that applies the measurement of obfuscation that users previously applied to the specific attribute of the user profiles to true data for a new user by fuzzing the true data to create a fuzzed value;
a generation module, stored in memory, that generates automatically a new user profile for a user of the specific service by populating the specific attribute within the new user profile with the fuzzed value; and
at least one physical processor configured to execute the analysis module, the detection module, the application module, and the generation module;
wherein:
the detection module further compares a more accurate set of information describing users with historical user profiles that the users manually generated, wherein the detection module learns both a set of items of information the users preferred to reveal and a set of items of information the users preferred to omit; and
the application module protects the privacy of the user by denying a request for data describing the user or reducing a level of accuracy of the true data when creating the fuzzed value to a degree that matches how the users manually performed a previous task of fuzzing.

12. The system of claim 11, wherein the generation module is further configured to perform a security action to protect the privacy of the new user corresponding to the new user profile.

13. The system of claim 12, wherein the security action comprises
denying a request for the user data; or
alerting the new user to the request for data describing the user.

14. The system of claim 11, wherein the generative model either:
matches the measurement of obfuscation to the specific service; or
matches the measurement of obfuscation to a combination of the specific service and the specific attribute.

15. The system of claim 11, wherein the specific attribute comprises at least one of:
a location of the new user; or
a birthday of the new user.

16. The system of claim 11, wherein the analysis module analyzes the data set of user profiles by detecting that users previously fuzzed values for the specific attribute by at least one of:
omitting a field of true data for the specific attribute; or
generating random data for the specific attribute.

17. The system of claim 11, wherein the data set of user profiles is derived from a password management system.

18. The system of claim 11, wherein the specific attribute comprises a picture of the new user.

19. The system of claim 11, wherein the specific attribute comprises a name of the new user.

20. A non-transitory computer-readable medium comprising one or more computer-readable instructions that, when executed by at least one processor of a computing device, cause the computing device to:
analyze a data set of user profiles for services and creating, by applying a machine learning protocol to the data set of user profiles, a generative model that generates new user profiles for users rather than the users manually creating the user profiles;
detect, by a detection module, a measurement of obfuscation that users previously applied to a specific attribute when manually creating user profiles for a specific service;
apply, by an application module, the measurement of obfuscation that users previously applied to the specific attribute of the user profiles to true data for a new user by fuzzing the true data to create a fuzzed value; and
generate automatically a new user profile for a user of the specific service by populating the specific attribute within the new user profile with the fuzzed value;
compare, by the detection module, a more accurate set of information describing users with historical user profiles that the users manually generated, wherein the detection module learns both a set of items of information the users preferred to reveal and a set of items of information the users preferred to omit; and
protect, by the application module, the privacy of the user by denying a request for data describing the user or reducing a level of accuracy of the true data when creating the fuzzed value to a degree that matches how the users manually performed a previous task of fuzzing.

* * * * *